US012019013B1

(12) United States Patent
Bruno et al.

(10) Patent No.: US 12,019,013 B1
(45) Date of Patent: Jun. 25, 2024

(54) ABATEMENT OF ASBESTOS USING FLUORINATED METAL COMPOUNDS

(71) Applicant: U.S. Government as Represented by the Secretary of the Army, Natick, MA (US)

(72) Inventors: Ferdinando F Bruno, Reading, MA (US); Manuele Bernabei, Rome (IT); LTC Andrea Chiappa, Rome (IT); David Ziegler, Clinton, MA (US); Nicole F Farhadi, Plymouth, MA (US)

(73) Assignee: Government of the United States as Represented by the Secretary of the Army

( * ) Notice: Subject to any disclaimer, the term of this patent is extended or adjusted under 35 U.S.C. 154(b) by 513 days.

(21) Appl. No.: 17/389,411

(22) Filed: Jul. 30, 2021

(51) Int. Cl.
 *G01N 21/35* (2014.01)
 *G01N 1/22* (2006.01)
 *A62D 101/41* (2007.01)
 *B09B 3/00* (2022.01)

(52) U.S. Cl.
 CPC ......... *G01N 21/35* (2013.01); *G01N 1/2273* (2013.01); *A62D 2101/41* (2013.01); *B09B 3/0066* (2013.01); *G01N 2021/3595* (2013.01)

(58) Field of Classification Search
 CPC ............... G01N 21/35; G01N 1/2273; G01N 2021/3595; A62D 2101/41; B09B 3/0066
 See application file for complete search history.

(56) References Cited

U.S. PATENT DOCUMENTS

| 5,753,035 A | * | 5/1998 | Block | C04B 41/4556 |
|  |  |  |  | 427/427 |
| 7,718,112 B2 |  | 5/2010 | Drew et al. |  |

OTHER PUBLICATIONS

Pawelczyk et al, Chemical elimination of the harmful properties of asbestos from military facilities, (Dec. 12, 2016), Elsevier, Waste Management 61 (2017) 377-385. (Year: 2016).*
I. Kagomiya & J. Sugihara & K. Kakimoto & H.Ohsato, "Mg2SiO4—TiO2 composite ceramics prepared using a liquid phase deposition process" (J Electroceram (2009) 22:327-333).
Daniel Cozak et al. "The reaction of chrysotile asbestos with titanium(III) chloride. Characterization of the reaction products" (Can. J. Chem. vol. 61, 1983).
Bruno et al. "Novel Synthesis of Ternary MgTiSi Alloys from Asbestos-Chrysotile" Aug. 19, 2018, 1 page.

* cited by examiner

*Primary Examiner* — Michael P LaPage
*Assistant Examiner* — Judy Dao Tran
(74) *Attorney, Agent, or Firm* — Timothy M. Barlow (57) ABSTRACT

The disclosed subject matter relates to a method of treating of asbestos or asbestos-containing material, comprising applying to the asbestos or asbestos-containing material a composition including a treatment compound comprising at least one of hexafluoro titanium di-ammonium, potassium hexafluoro zirconate, ammonium hexafluoro phosphate, ammonium hexafluoro stannate, ammonium hexafluoro germanate, ammonium tetrafluoro borate or ammonium heptafluoro tantalite; and a fluorine scavenger compound.

7 Claims, 8 Drawing Sheets

ABATEMENT OF ASBESTOS USING FLUORINATED METAL COMPOUNDS

STATEMENT OF GOVERNMENT INTEREST

The invention described herein may be manufactured and used by or for the U.S. Government for governmental purposes without the payment of any royalties thereon or therefor.

FIELD

This disclosure relates to a methods and compositions used therein in treating and/or abating asbestos.

BACKGROUND

Asbestos, a mineral composite formed principally by chrysotile, until 1977, found wide application for sound absorption, average tensile strength fiber, providing affordability, and resistance to fire, heat, and electricity. Chrysotile has been used in building materials (e.g., insulation materials, tiles, wallboard, siding and roofing (including roofing shingles, roofing felt, base flashing, cement wallboard, cement siding, ceiling tiles and lay-in panels, asphalt floor tile, vinyl floor tile, vinyl sheet flooring, flooring backing, vinyl wall coverings)) molding materials, coatings and adhesives, fiber bonders and flame retardants. There has been a much concern over the toxic effects of asbestos which is still used in countries such as India, Russia, China, Indonesia and Brazil, not to mention it was used in this country and, thus, still poses a health threat here as well. Asbestos has been found to contribute to the cause of 104,000 deaths and 1,523,000 people have suffered permanent disability because of exposure to asbestos. It is estimated that 125,000,000 are still exposed to this compound worldwide. For this reason, asbestos has been totally banned in countries like United States, Europe, Australia, Japan, and New Zealand. In the United States of America (USA) asbestos is regulated under the Toxic Substance Control Act and the Asbestos Hazard Emergency Response Act for school buildings. Yet it is very well known, for centuries, to be one of the best fire retardants. In recent decades, there has been a tremendous surge towards the development of an alternative, totally new, fire retardant (FR) materials to try in circumventing the toxic effects of asbestos. Such alternatives, however, can involve synthetic routes that are nevertheless toxic (e.g. for the formation of halogenated compounds) and/or they produce materials that have a high final cost, and high mechanical rigidity (e.g. Kevlar and Nomex) creating problems in the final compounding. Furthermore, the cost, color-matching and weight of such materials is prohibitive. Flame retardant treated cottons/nylons can have a lower cost, but they add 20% weight, use toxic halogenated polymers, and generate toxic, corrosive and halogenated gases during combustion. Alternative enzymatic reactions have since been investigated to improve FR of silicate polymers. However, the long reaction times are prohibitive for a mass industrial scale production.

In the Airline Industry there is a need of inexpensive and environmentally safer or less toxic FR. Public gatherings (movie theaters, hotels, stadiums etc.) have safety requirements for fire emergency. Computer equipment that operate with high power (i.e. high heat) can require FR products. General use electronics (e.g. TV and cellphones) has more stringent requirements. The automobile industry now utilizes more high impact plastic products that require FR.

There is a tremendous need for a low cost, efficient, environmentally sound FR. For the reasons mentioned previously it will be very advantageous to have a simple, fast and facile way to transform asbestos fibers, as chrysotile, into an inert additive that still retains the desired properties of a fire retardant.

There is a high demand for FR that are stable at high temperature such as paints for rockets or supersonic jets or for clothing. These fibers have high thermal stability. There is an urgent need for a quick technique to abate asbestos. There is no known technique to quickly detect asbestos. Detection nowadays is done with a microscopic analysis.

SUMMARY

In one embodiment, a method of treating of asbestos or asbestos-containing material is provided. The method includes applying to the asbestos or asbestos-containing material a composition including a treatment compound comprising at least one of hexafluoro titanium di-ammonium, potassium hexafluoro zirconate. ammonium hexafluoro phosphate. ammonium hexafluoro stannate, ammonium hexafluoro germanate, ammonium tetrafluoro borate or ammonium heptafluoro tantalite and a fluorine scavenger compound.

In another embodiment, a method of treating of asbestos or asbestos-containing material including chrysotile is provided. The method includes a treatment compound comprising hexafluoro titanium di-ammonium and a fluorine scavenger compound comprising boric acid.

In another embodiment, a method of testing for the presence of asbestos is provided. The method includes taking a sample, mixing the sample with a test composition to form a mixture, the test composition including a fluoro compound comprising at least one of hexafluoro titanium di-ammonium, potassium hexafluoro zirconate. ammonium hexafluoro phosphate. ammonium hexafluoro stannate, ammonium hexafluoro germanate, ammonium tetrafluoro borate or ammonium heptafluoro tantalite and a fluorine scavenger compound, obtaining an FTIR spectrum of the mixture and examining the FTIR spectrum for a peak at 873.6 inverse centimeters ($cm^{-1}$).

It is an object of the present disclosure to provide a novel procedure for the fast abatement of asbestos including, for example, fibrous asbestos and airborne fibrous asbestos.

It is yet another object of the present disclosure to provide an approach and method which results in the production of a safer or less toxic FR which has similar thermal, mechanical, and optical properties over the unmodified asbestos.

It is yet another object of the present disclosure to provide an approach, methods and compositions which results in the formation of a chemically bounded (i.e. not airborne spreadable) asbestos.

It is yet another object of the present disclosure to provide an approach, methods and compositions which results in the modification of natural polymer asbestos using fluorinated compound such as Potassium hexafluoro zirconate.

It is yet another object of the present disclosure to provide an approach, methods and compositions which results in the modification of natural polymer asbestos using fluorinated compound such as Ammonium hexafluoro phosphate.

It is yet another object of the present disclosure to provide an approach, methods and compositions which results in the modification of natural polymer asbestos using fluorinated compound such as Ammonium hexafluoro stannate.

It is yet another object of the present disclosure to provide an approach, methods and compositions which results in the modification of natural polymer asbestos using fluorinated compound such as Ammonium hexafluoro germanate.

It is yet another object of the present disclosure to provide an approach, methods and compositions which results in the modification of natural polymer asbestos using fluorinated compound such as Ammonium tetrafluoro borate.

It is yet another object of the present disclosure to provide an approach, methods and compositions which results in the modification of natural polymer asbestos using fluorinated compound such as Ammonium heptafluoro tantalite.

It is yet another object of the present disclosure to provide an approach, methods and compositions which results in the various architectures and material s including but not limited to coatings, high temperature resistant paints, thin films, fibers, chaff materials, hydrogen fuel cells, and membranes.

It is yet another object of the present disclosure to provide an approach, methods and compositions which results in the modified asbestos applicable to wood composites laminates, foundry resins, abrasives, friction and molding materials, coatings, and flame retardants.

It is yet another object of the present disclosure to provide techniques, methods and compositions which results in the modified asbestos complex where the optical and electronic properties (ion and electronic transportation) of the final complex can be tailored and optimized by judicious inclusion of a matrix material.

These matrix materials may include and are not limited to polymers and/or pendant groups, aliphatic backbones and/or pendant groups, optically active (chromophoric) backbones and/or pendant groups, electrically active backbones and/or pendant groups and various degrees of ionization.

The ionized groups on these matrix materials may include and are not limited to sulfonates, carboxylates, and phosphates. The matrix may also contain the appropriate functional groups such that they can interact with the modified asbestos through Hydrogen bonding type of interactions, Van Der Walls interactions and ionic interaction.

Manipulation of the molecular weight, purity and charge of the matrices can allow for optimized crosslinking/interaction and processing conditions.

The functionalities of the modified asbestos may be tuned to impart the required mechanical, thermal, chemical, electrical and optical properties through chemical reaction with other functionalized compounds.

The modified asbestos in these polymer complexes can allow for use in a wide range of applications including, but not limited to, wood composites laminates, foundry resins, abrasives, molding materials, coatings, fiber bonders and flame retardants, high temperature resistant paints, and chaff materials. Additional objects, as well as features and advantages of embodiments of the present disclosure, will be set forth in part in the description which follows, and in part will be obvious from the description or may be learned by practice of the embodiments of the present disclosure. The objects, features and advantages of the present disclosure may be realized and attained by means of the instrumentation and combinations particularly pointed out in the appended claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

The terms "%", "% by weight", "weight %" and "wt %" are all intended to mean unless otherwise stated, percents by weight based upon a total weight of 100% end composition weight. Thus 10% by weight means that the component constitutes 10 wt. parts out of every 100 wt. parts of total composition.

Aspects of the present disclosure relates generally to the abatement of airborne asbestos caused by asbestos containing material such as, for example, asbestos tiles, asbestos insulation materials, etc. The reaction is conducted in ambient environment (room temperature and ambient pressure) and in water. There is no need of a catalyst system and the final product has a low production cost. Once treated, the treated asbestos fibers will not become airborne and a health hazard to those to whom are exposed to the treated asbestos.

Embodiments of the present disclosure can also be used to treat asbestos fibers that are already airborne. Treating airborne asbestos using the methods and compositions embodiments of the present disclosure are believed to coat the airborne asbestos fibers and may cross-link them with other treated airborne asbestos fibers, thus may reducing, minimizing or eliminating the toxic effects of the airborne asbestos fibers.

These conglomerated fibers after the treatment included in the present disclosure could be used, after verification via biological test, as a safer or less toxic fire retardants, brake linings, fire barriers in fuse boxes, pipe insulation, floor tiles, residential shingles, high temperature paint for supersonic rockets/airplanes, and gaskets for high temperature equipment with minimal, if any, airborne asbestos.

Types of asbestos may include, but are not limited to, various asbestos groups' type such as amphibole compounds including chrysotile amosite (referred to as "chrysotile"), crocidolite, tremolite, anthophyllite and actinolite or other similar natural compounds (e.g. talc) or modified by functional groups. Functional groups could include but are not limited to methoxy, methyl, ethyl, sulfonate, carboxylate and hydroxyl groups. The term "asbestos" used herein refers to all such types. 95% of asbestos is composed of chrysotile and it is the chrysotile compounds that is toxic to living creatures like humans and other mammals.

Aspects of the present disclosure include method for the fast modification/abatement of asbestos to minimize the amount of airborne asbestos present in the air or from migrating to the air from asbestos-containing materials. The method generally includes the reaction of an aqueous solution containing a fluorinated metal with the introduction of a scavenger such as boric acid. The resulting modified asbestos may be used as is for subsequent processing strategies and may be less toxic because the amphibole compounds including chrysotile are cross-linked, coated or both after treatment with the fluorinated metal compounds included in embodiments of the present disclosure.

It is believed that the methods described in the present disclosure, particularly the modification of asbestos by the treatment embodiments included herein results in a treated asbestos that is structurally different from the unmodified (e.g., untreated) asbestos.

Embodiments of the present disclosure result in the abatement of toxic asbestos and the use of chemically modified and chemically bonded asbestos. Since asbestos mixed with compounds using current strategies are still highly toxic, the new chemical modification of the present disclosure after treatment using the embodiments of the present disclosure and these synthetic strategies provides significant improvement in mild reaction conditions, and inexpensive modification opportunities for commercial applications.

An embodiment of the present disclosure includes treatment of asbestos including at least amphibole compound, such as, for example, chrysotile generally includes applying to asbestos or asbestos-containing material including at least one amphibole compound, such as, for example, chrysotile a composition (e.g., an aqueous composition) of (a) one of the following fluoro treatment compounds: hexafluoro titanium di-ammonium (also referred to herein as HFTA), potassium hexafluoro zirconate. ammonium hexafluoro phosphate. ammonium hexafluoro stannate, ammonium hexafluoro germanate, ammonium tetrafluoro borate or ammonium heptafluoro tantalite and (b) a fluorine scavenger compound such as for example, boric acid ($H_3BO_3$). The preferred treatment compound is HFTA and the boric acid is the preferred fluorine scavenger.

Other fluorine scavengers can include citric acid, and phosphoric acid and other similar acids that a chemist can delve.

The treatment can be performed at room temperature (e.g., about 25° C.) and normal atmospheric pressure (e.g., about 1 atm) but can also be performed at temperatures ranging from about 5° C. to about 40° C. and pressures ranging from about 0.9 atm to about 10 atm.

Figure 1:
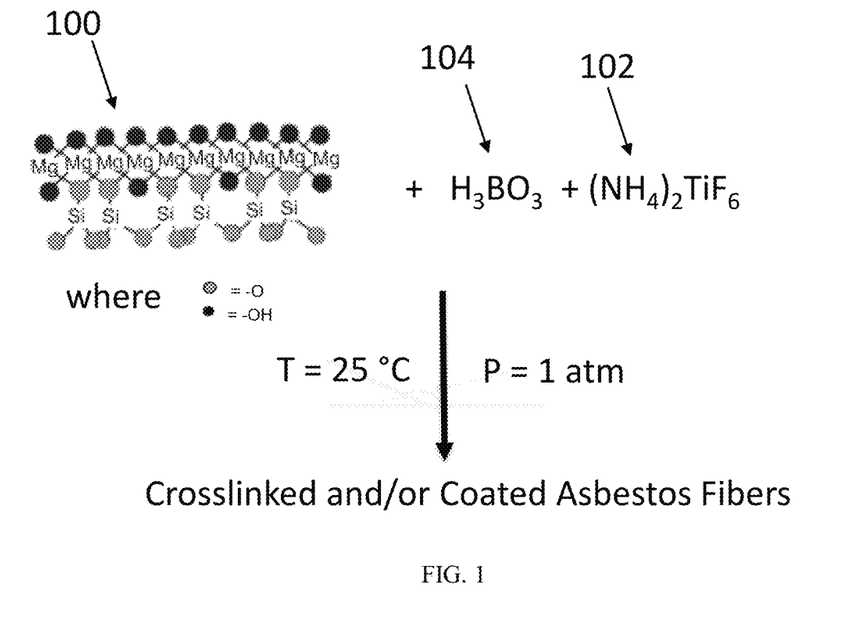
FIG. 1 is an illustration of the reaction of one embodiment of the present disclosure.

One of the embodiments of the present disclosure is illustrated in FIG. 1 and is a method for treating chrysotile 100 with HFTA 102 and boric acid 104. The treatments of the present disclosure resulting from the treatment compound may result in crosslinked asbestos fibers, coated asbestos fibers or both where the asbestos include chrysotile or possibly other amphibole compounds included therein.

Embodiments of the present disclosure include the amount of treatment compound being at least equimolar to the molar amount of asbestos (e.g., amphibole compounds, such as chrysotile) being treated, preferably greater than the molar amount of asbestos (e.g., amphibole compounds such as chrysotile) being treated (in excess of the molar amount of asbestos (e.g., amphibole compounds such as chrysotile)), from about 0.1 M to about 0.3 M greater than the molar amount of asbestos being treated. In order to best determine the concentration, the asbestos material in solid form or airborne can be tested to determine the concentration therein or the amphibole compounds therein and the treatment compound concentration adjusted accordingly.

Embodiments of the present disclosure include the amount of fluorine scavenger compound being a molar amount similar or in excess of the molar amount of the fluorine molar amount in the treatment compound, for example, 0.12 M of HFTA and 0.24 M of boric acid or in an amount of fluorine scavenger compound providing at least one or greater than one hydrogen for each fluorine in the treatment compound.

Figure 2A:
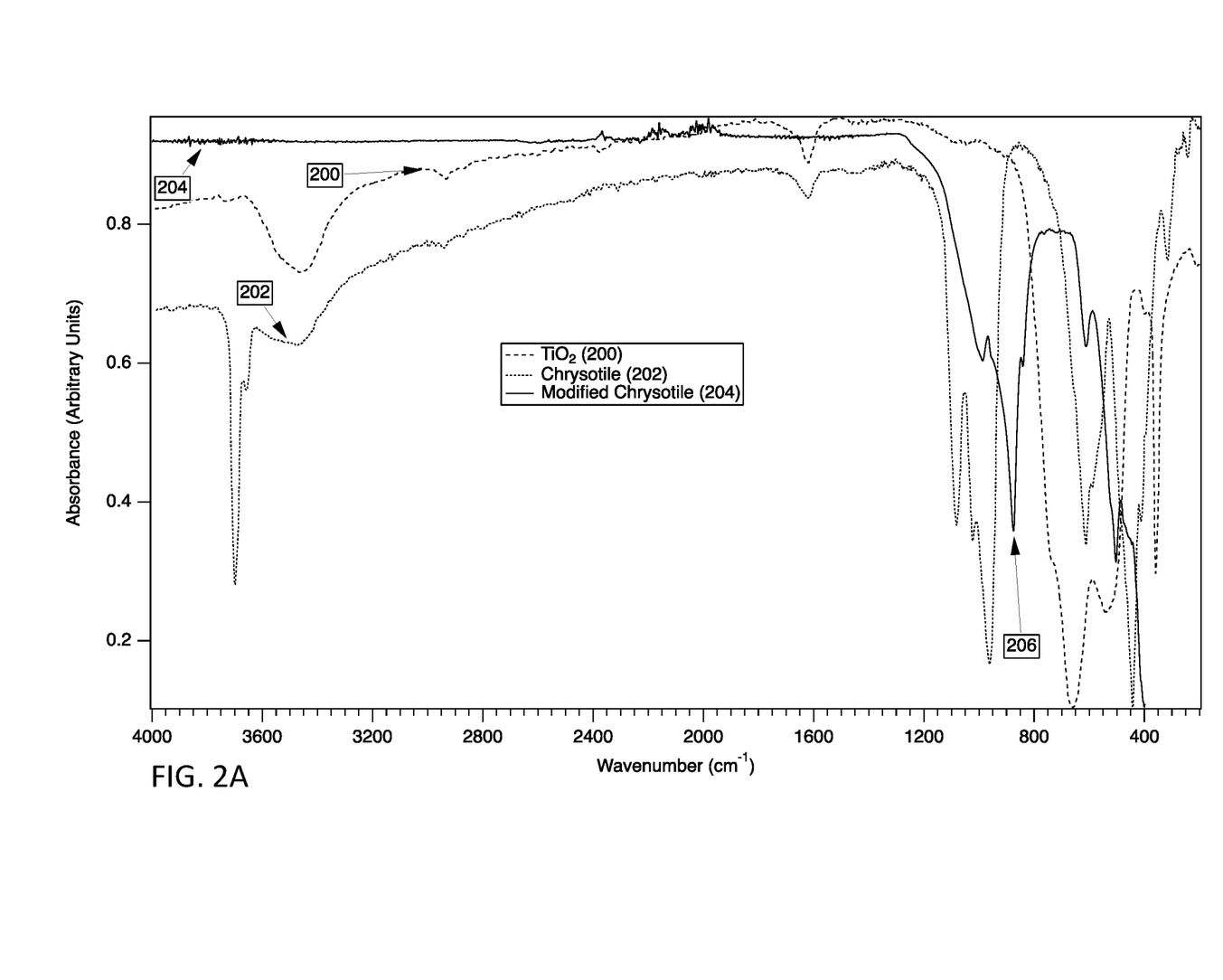
FIG. 2A is a graphic illustration of FTIR data for of the chrysotile and of the modified chrysotile.
Figure 2B:
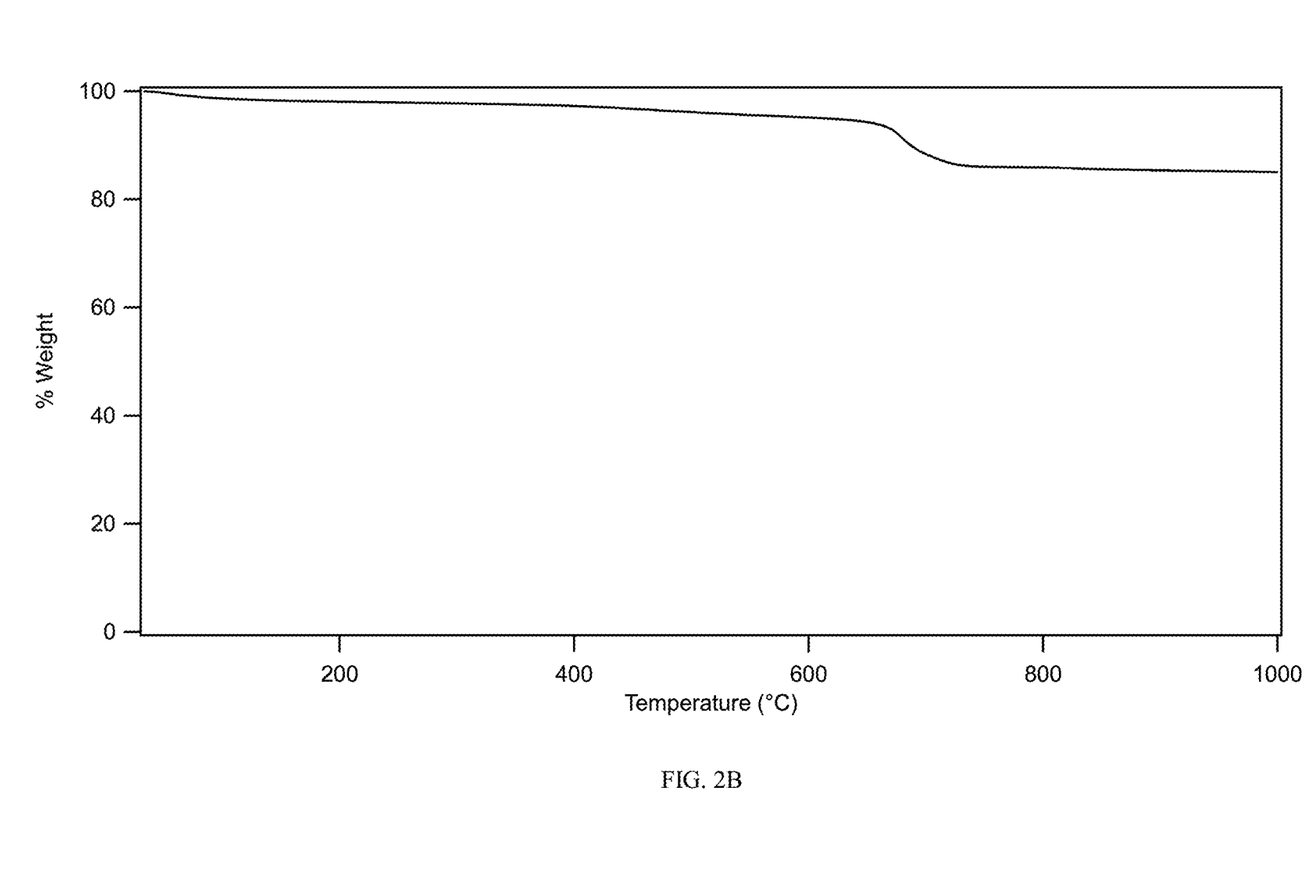
FIG. 2B is a graphic illustration of thermal stability data of modified chrysotile.

In one embodiment, 10 milligrams (mg) of chrysotile were immersed in equal volume of aqueous 0.12 molar (M) of hexafluoro Titanium di-Ammonium and 0.24 M boric acid ($H_3BO_3$) as a fluorine scavenger. It was determined, by Fourier Transformed InfraRed (FTIR) spectroscopy that the reaction was completed after about 20 seconds. Nevertheless, the reaction was monitored each hour for about 8 hours (HRS) using a pH meter to assess the pH until neutrality is reached. The precipitate was separated with a cellulose (low ashes) filter paper and was dried for one day in an oven at 55 degrees Celsius (° C.). Gravimetric analysis was implemented to assess the final yield. For the gravimetric analysis a temperature of 600° C. (for one minute) was reached to burn the filter. The yield after four measurements was 95.1%. FTIR of the chrysotile and of the modified chrysotile (e.g., modified or treated asbestos) was collected and is shown in FIG. 2A along with that of $TiO_2$. A new prominent peak 206 is observed at 873.6 inverse centimeters ($cm^{-1}$) for the final product. The assignment is believed that the Ti reacted with the Mg/Si of the chrysotile creating a new mineral alloy. FIG. 2B includes thermal stability data of the modified chrysotile and shows that the modified chrysotile is thermally stable 85% at 1000° C.

Figure 3:
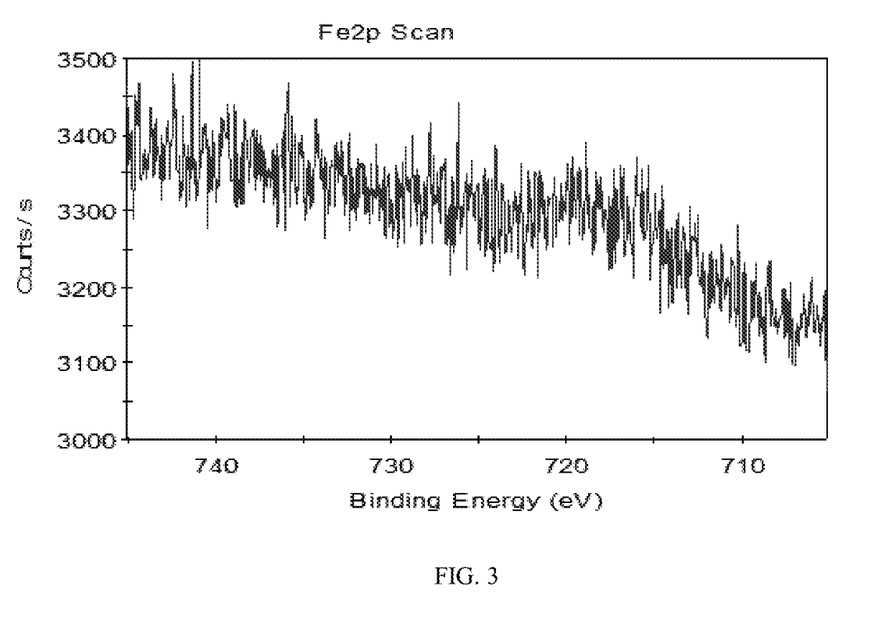
FIG. 3 is a graphic illustration of XPS data of Iron (Fe) III region for the modified asbestos.

The subsequent analysis by X-ray Photonic Spectra (XPS) proved that the iron, present in the chrysotile, is totally covered and that modified asbestos is not readily dispersible in the air even after a rough mechanical destruction. The XPS data is shown in FIG. 3 is of Fe (III) region. The Fe is quantitatively absent on the surface of the modified asbestos. This is an important finding because it is believed that the iron that is present in the asbestos may be the culprit for the formation of reactive oxygen species that is capable of creating a permanent and deadly change of the reproductive capability of the human cell (i.e. cancer). Furthermore, the chemical modification of the fibers does not allow and may minimize the fibrillation and distribution of the particle fibers in the air, impeding the human absorption.

Figure 4A:
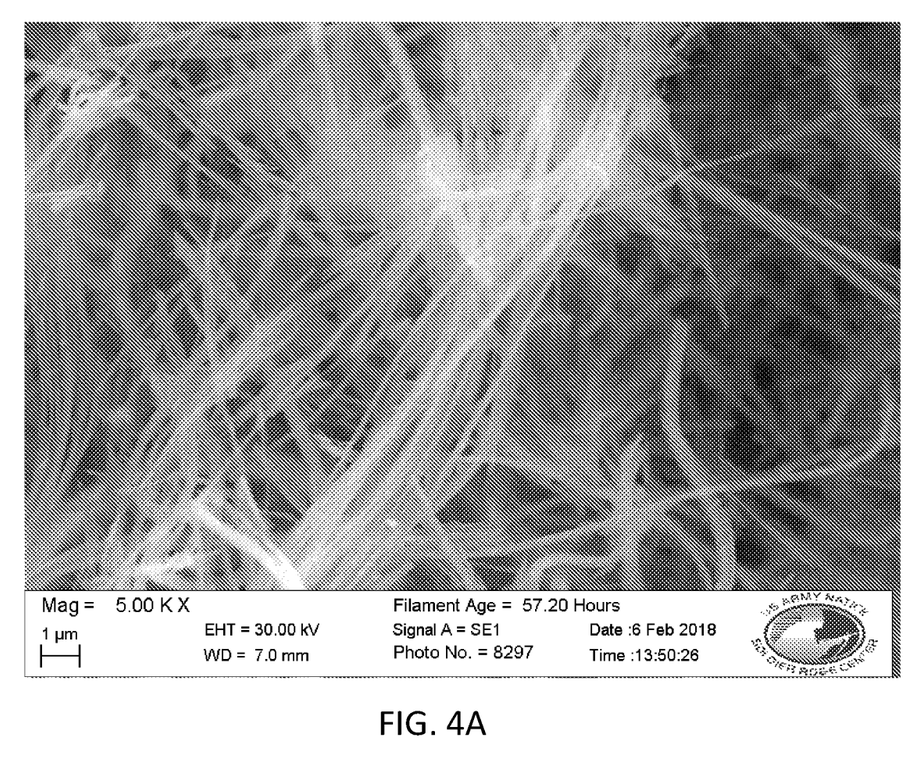
FIG. 4A is an SEM image (large magnification) of untreated chrysotile.
Figure 4B:
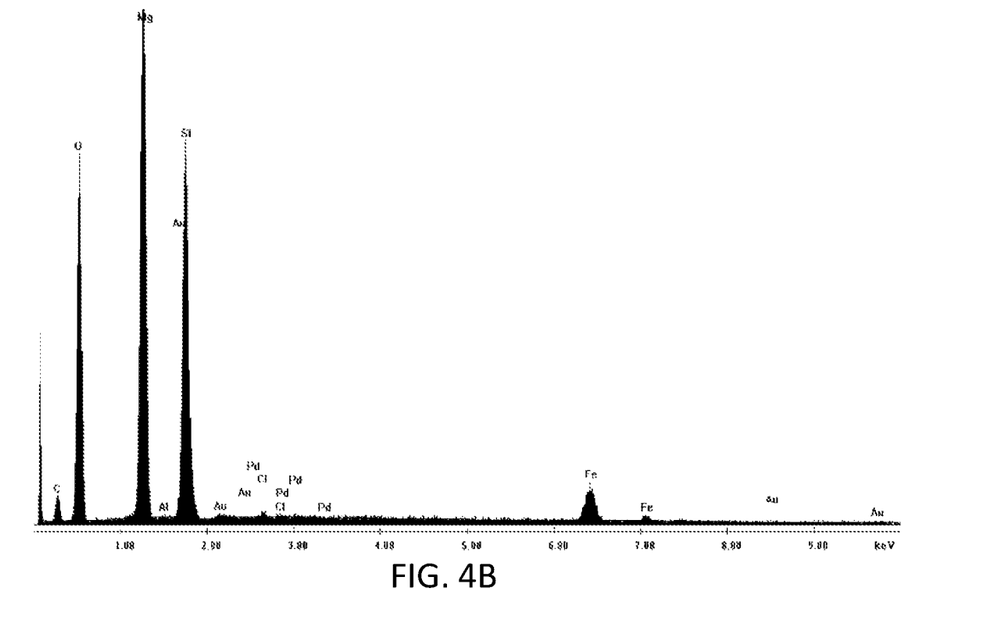
FIG. 4B is a graphic illustration of EDS data of the untreated chrysotile of FIG. 4A.
Figure 5A:
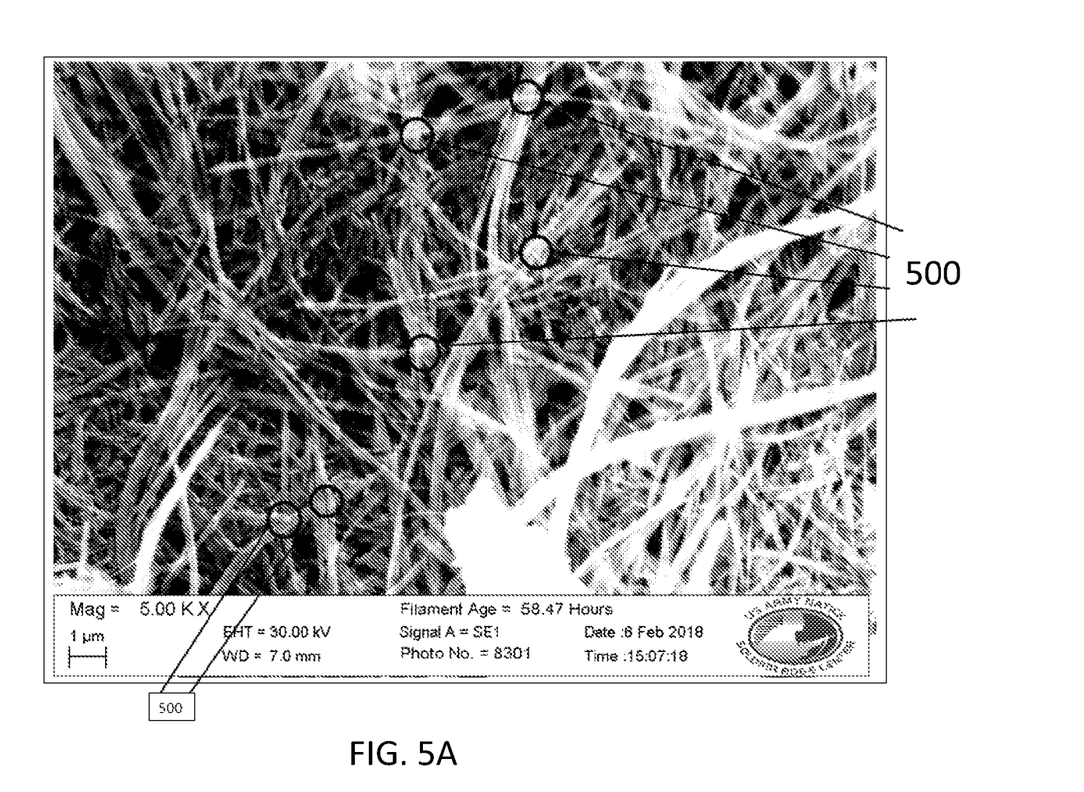
FIG. 5A is an SEM image (large magnification) of treated chrysotile.
Figure 5B:
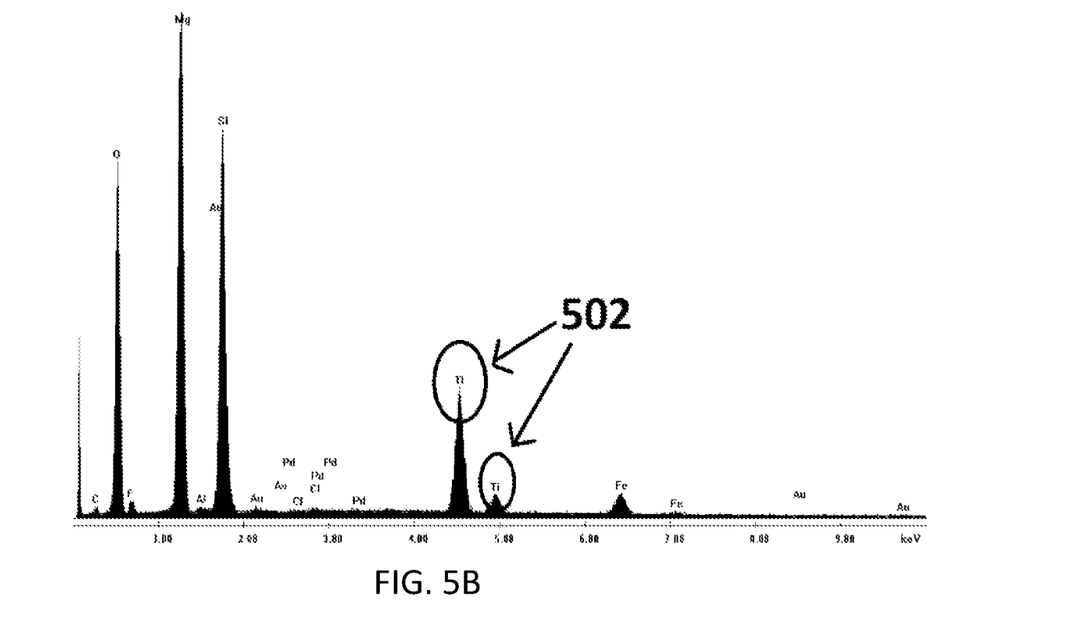
FIG. 5B is a graphic illustration of EDS data of the untreated chrysotile of FIG. 5A.

Data from scanning electron microscopy/energy dispersive spectroscopy (SEM-EDS) are shown in FIGS. 4A, 4B, 5A and 5B. Untreated chrysotile SEM is shown in FIG. 4A and the corresponding EDS data is shown in FIG. 4B. Treated chrysotile SEM is shown in FIG. 5A and the corresponding EDS data is shown in FIG. 5B. A comparison of FIG. 4A to FIG. 5A shows the different 3D placement of the asbestos modified (i.e. presence of crosslinking points absent in the pure asbestos, but present, for example, in FIG. 5A at 500). A comparison of FIG. 4B to FIG. 5B shows presence of Titanium (Ti) in the modified asbestos at, for example, regions 502 in FIG. 5B.

Figure 6A:
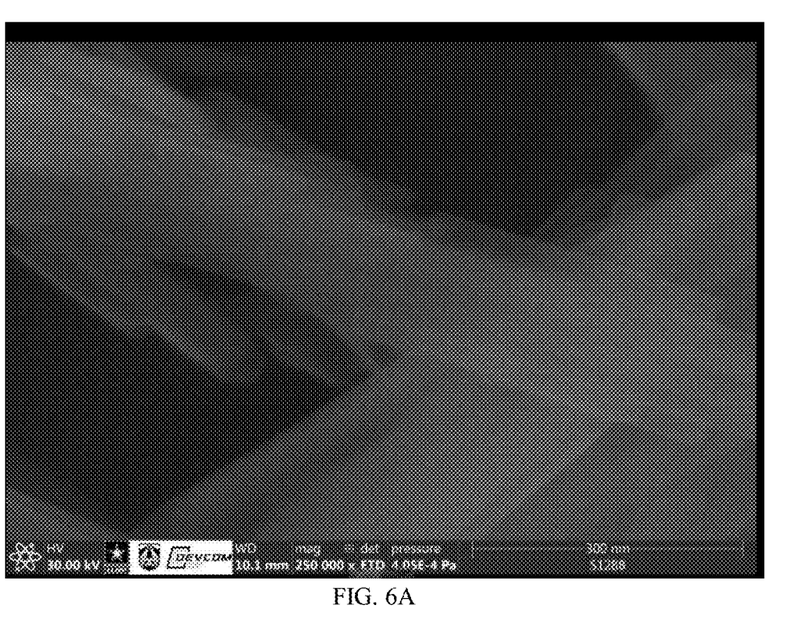
FIG. 6A is a high definition image of untreated asbestos.
Figure 6B:
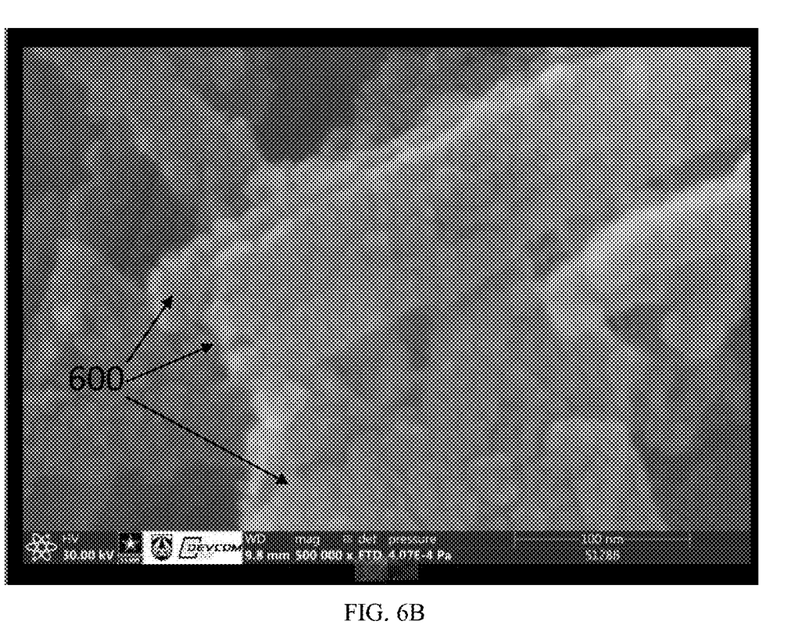
FIG. 6B is a high definition image of treated asbestos.

Data from scanning electron microscopy (SEM) are shown in FIGS. 6A, and 6B. FIG. 6A is a high definition image of untreated asbestos and FIG. 6B is a high definition image of treated asbestos. A comparison of FIG. 6A to FIG. 6B shows pustule-type Ti, covering of asbestos, for example, at 600.

Figure 7:
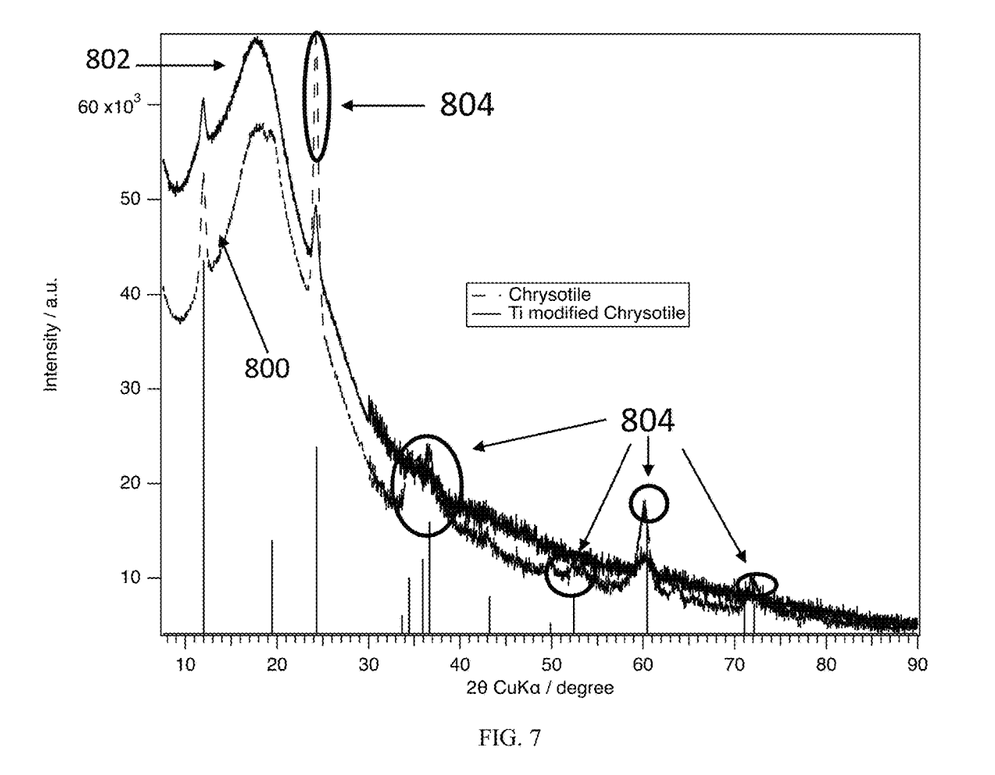
FIG. 7 is a graphic illustration of X-ray diffractometry data of untreated chrysotile and treated chrysotile.
Figure 8:
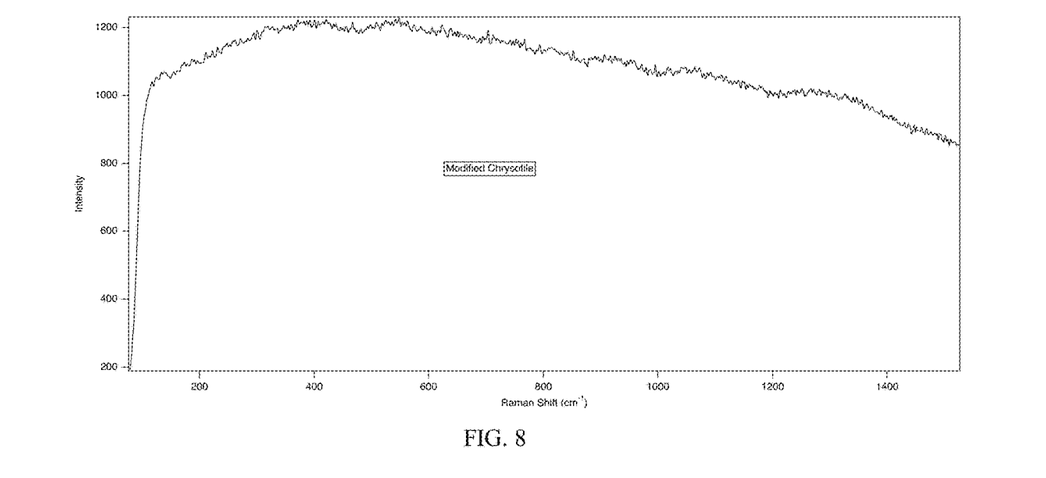
FIG. 8 is a graphic illustration of Fourier Transformed-RAMAN data of treated chrysotile.

Additional data is shown in the X-ray diffractometry analysis (XRD) of FIG. 7 and the Fourier Transformed-RAMAN spectroscopy data of FIG. 8. FIG. 7 includes data for both untreated chrysotile 800 and treated chrysotile (i.e., TI modified chrysotile) 802. A comparison of the untreated asbestos 800 and treated asbestos 802 shows a less crystalline surface is formed, for example, at spectrum regions 804 of untreated chrysotile 800 on FIG. 7. FIG. 8 includes Fourier Transformed-RAMAN spectroscopy data of treated chrysotile (i.e., modified chrysotile) is flat and shows that Ti is covering the surface of the chrysotile fibers. It is well known that a Fourier Transformed-RAMAN spectroscopy data of untreated chrysotile (i.e., unmodified chrysotile) would not be flat and would have several distinct peaks. The Fourier Transformed-RAMAN spectroscopy data of treated chrysotile in FIG. 8 also indicates that we do not have free chrysotile because, as noted above it is flat. Titanium has no FT-RAMAN and is flat, as we see in the spectra of FIG. 8, thus demonstrating that there is titanium coated chrysotile. If we had not covered the fibers with titanium as accomplished by one of the embodiments of the present disclosure, we would see a spectrum that is not flat and would have several distinct peaks indicative of unmodified chrysotile.

Chrysotile and probably other amphibole compound can be modified to a high yield of modified or treated material (e.g., about 91.2% yield with some embodiments of the present disclosure) in a crosslinked fiber net. The reaction can be extremely fast (reaction time can be from about 10 to about 30 seconds with some embodiments of the present disclosure) and can be conducted at room temperature and ambient pressure. FTIR, TGA and SEM-EDS data demonstrate the presence of a new alloy that is highly thermally stable with the presence of Ti in the new alloy. XRD data demonstrates that a partial remaining of the Xline structure is present. Iron is present in small traces on the surface as demonstrated by XPS data and quantitative analysis via SEM-EDS shows a decrease of 50% in iron.

There is a high demand for FR that are stable at high temperature such as paints for rockets or supersonic jets or for clothing. As shown in FIG. 2B, these treated fibers have high thermal stability at a wide range of temperatures. Embodiments of the present disclosure also include coatings, high temperature resistant paints, thin films, fibers, chaff materials, hydrogen fuel cells, and membranes that include asbestos material that has been treated as included in embodiments of the present disclosure and can work as an FR material. Such embodiments include incorporating a sufficient amount of such treated or modified asbestos into paints, thin films, fibers, chaff materials, hydrogen fuel cell insulation material, membranes, wood composites laminates, foundry resins, abrasives, friction and molding materials, coatings, and flame retardants materials. Concentrations of the treated or modified asbestos in such embodiments can depend on the amount of heat resistance or insulation that is desired in each of those embodiments, but can generally range from about 1% to about 10%. Incorporation of embodiments of the present disclosure into such materials can include, for example, mixing the treated asbestos into a liquid or uncured form (e.g., a paint composition (e.g., a liquid titanium paint composition), including a network of treated asbestos fibers into a membrane substrate and including treated asbestos as a laminate layer into a multilayered laminated material.

Embodiments of the present disclosure can also include optical and electronic components which may possess properties (ion and electronic transportation for transistor-type) and can be tailored and optimized by judicious inclusion of a matrix material of the compositions including treated or modified asbestos embodiments of the present disclosure.

Embodiments of the present disclosure can also include matrix materials having embodiments of treated or modified asbestos embodiments of the present disclosure and may also include and are not limited to polymers and/or pendant groups, aliphatic backbones and/or pendant groups, optically active (chromophoric) backbones and/or pendant groups, electrically active backbones and/or pendant groups and various degrees of ionization. Ionized groups on these matrix materials may include and are not limited to sulfonates, carboxylates, and phosphates. The matrix may also contain the appropriate functional groups such that they can interact with the modified asbestos through hydrogen bonding type of interactions, Van Der Walls interactions and ionic interaction. Manipulation of the molecular weight, purity and charge of the matrices can allow for optimized crosslinking/interaction and processing conditions.

Other embodiments of the present disclosure can also include functionalities of the modified or treated asbestos that may be tuned to impart the required mechanical, thermal, chemical, electrical and optical properties through chemical reaction with other functionalized compounds.

The modified or treated asbestos in these polymer complexes or matrices can allow for use in a wide range of applications including, but not limited to, wood composites laminates, foundry resins, abrasives, molding materials, coatings, fiber bonders and flame retardants, high temperature resistant paints, and chaff materials.

Embodiments of the present disclosure also include a method to determine the presence (or absence) of asbestos including the amount of amphibole compounds (including chrysotile). Such embodiments can include taking a sample of material (e.g., building material) or an air sample in an area believed to include asbestos material, mixing the samples with one of the embodiments of the present disclosure (i.e., treating compound and fluorine scavenger embodiments of the present disclosure) and taking a spectra (e.g., FTIR) of the resulting solution and looking for a peak at 873.6 inverse centimeters ($cm^{-1}$) indicative of asbestos through the detection of modified or treated asbestos through presence of a peak at 873.6 inverse centimeters ($cm^{-1}$). Such a test can distinguish between asbestos fiber and glass fibers where the latter can be mistaken for the former. Using a portable spectrophotometer, such tests can be performed in the field (at the site where the suspected material is present) and can provide a quick and easy answer without having to send the sample to an outside laboratory for analysis that needs to shipped and can take substantially longer in time.

Embodiments of the present disclosure for testing for asbestos including the amount of amphibole compounds (including chrysotile) in the field includes applying to the sample a composition (e.g., an aqueous composition) of (a) one of the following fluoro compounds: hexafluoro titanium di-ammonium (from here called HFTA), potassium hexafluoro zirconate. ammonium hexafluoro phosphate. ammonium hexafluoro stannate, ammonium hexafluoro germanate, ammonium tetrafluoro borate or ammonium heptafluoro tantalite and (b) a fluorine scavenger compound such as for example, boric acid ($H_3BO_3$). The preferred treatment compound is HFTA and the boric acid is the preferred fluorine scavenger. The concentration of treatment compound should be in molar excess of the asbestos (e.g., amphibole compounds such as chrysotile) to which it is applied. In order to best determine the concentration, the asbestos material in solid form or airborne can be tested to determine the concentration therein or the amphibole compounds therein and the treatment compound concentration adjusted accordingly.

Embodiments of the present disclosure can result in treatment of asbestos on the surface of the solid material or airborne and, thus minimize its toxic effects on exposure to people by the fibers of the asbestos being coated, crosslinked to other fibers or both. However, for solid materials including asbestos, once the physical integrity is compromised because, for example, a piece of the solid material is broken off or there is an abrasion of the surface of the material, a follow-up treatment will be needed to treat the newly exposed asbestos-containing material.

Example 1

10 mg of chrysotile (type 02740-AB, Structure Probe, Inc. West Chester, PA, USA) were immersed in equal volume of aqueous 0.12 M of HFTA (Sigma-Aldrich) and 0.24 M boric acid (Sigma-Aldrich) as fluorine scavenger. The reaction was monitored each hour for 8 HRS using a pH meter (Seven Easy, Mettler Toledo, Schwerzenbach, Switzerland) to assess the pH. The precipitate was separated with a cellulose filter (low ashes, Whatman™ Grade 540, Thermo Fisher Scientific) and was dried for one day in an oven at 55° C. Gravimetric analysis was implemented to assess the final yield. For the gravimetric analysis a temperature of 600° C. (for one minute) was reached to burn the filter. The yield after four measurements was of 95.1%. The optical measurements were assessed with a Nicolet 6700 Spectrophotometer (Thermo Fisher Scientific).

Example 2

10 mg of chrysotile were immersed in equal volume of aqueous of 0.12 M of Potassium hexafluoro zirconate (Sigma-Aldrich) and 0.24 M boric acid as fluorine scavenger. The reaction was monitored each hour for 8 HRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 96.3%. The optical measurements were assessed with a Nicolet 6700 Spectrophotometer.

Example 3

10 mg of chrysotile were immersed in equal volume of aqueous of 0.12 M of Ammonium hexafluoro phosphate (Sigma-Aldrich) and 0.24 M boric acid as fluorine scavenger. The reaction was monitored each hour for 8 HRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 95.8%. The optical measurements were assessed with a Nicolet 6700 Spectrophotometer.

Example 4

10 mg of chrysotile were immersed in equal volume of aqueous 0.12 M of Ammonium hexafluoro stannate (Sigma-Aldrich) and 0.24 M boric acid as fluorine scavenger. The reaction was monitored each hour for 8 FIRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 95.6%. The optical measurements were assessed with a Nicolet 6700 Spectrophotometer.

Example 5

10 mg of chrysotile were immersed in equal volume of aqueous 0.12 M of Ammonium hexafluoro germanate (Sigma-Aldrich) and 0.24 M boric acid as fluorine scavenger. The reaction was monitored each hour for 8 FIRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 95.6%. The optical measurements were assessed with a Nicolet 6700 Spectrophotometer.

Example 6

10 mg of chrysotile were immersed in equal volume of aqueous 0.12 M of Ammonium tetrafluoro borate (Sigma- Aldrich) and 0.2 M boric acid as fluorine scavenger. The reaction was monitored each hour for 8 FIRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 95.3%. The optical measurements were assessed with a Nicolet 6700 Spectrophotometer.

Example 7

10 mg of chrysotile were immersed in equal volume of aqueous 0.12 M of Ammonium heptafluoro tantalate (Sigma-Aldrich) and 0.2 M boric acid as fluorine scavenger. The reaction was monitored each hour for 8 HRS using a pH meter to assess the pH. The precipitate was separated with a cellulose filter (low ashes) and was dried for one day in an oven at 55° C. Gravimetric analysis was implemented to assess the final yield. For the gravimetric analysis a temperature of 600° C. (for one minute) was reached to burn the filter. The yield after four measurements was of 95.7%. The optical measurements were assessed with a Nicolet 6700 Spectrophotometer.

The embodiments of the present disclosure represent a significant advancement over current strategies used for the use of asbestos as FR. This approach addresses and resolves all of the current limitations, which have prevented the commercial viability of use of asbestos, due to the high toxicity. The reaction approach described in the present disclosure provides a specific, synthetic approach, which may be carried out at neutral pH's in water or in air. This is a significant advancement in the abatement of asbestos and that scale-up use of the modified asbestos as a safer or less toxic FR. Moreover, this is a significant advancement for the development of a new safer or less toxic FR from asbestos with unchanged thermal and mechanical properties.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All publications, including but not limited to, issued patents, patent applications, and journal articles, cited in this application are each herein incorporated by reference in their entirety.

Thus, while there have been shown, described and pointed out, fundamental novel features of the present disclosure as applied to the exemplary embodiments thereof, it will be understood that various omissions and substitutions and changes in the form and details of devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

The invention claimed is:

1. A method of testing for the presence of asbestos, comprising:
    taking a sample;
    mixing the sample with a test composition to form a mixture, the test composition including
    a fluoro compound comprising at least one of hexafluoro titanium di-ammonium, potassium hexafluoro zirconate, ammonium hexafluoro phosphate, ammonium hexafluoro stannate, ammonium hexafluoro germanate, ammonium tetrafluoro borate or ammonium heptafluoro tantalite, and
    a fluorine scavenger compound;
    obtaining an FTIR spectrum of the mixture; and
    examining the FTIR spectrum for a peak at 873.6 inverse centimeters (cm−1).

2. The method according to claim 1, wherein the sample is taken of material suspected of containing asbestos.

3. The method according to claim 1, wherein the sample is taken of a building material suspected of containing asbestos.

4. The method according to claim 1, wherein the sample is an air sample taken from an area adjacent to material suspected of containing asbestos.

5. The method according to claim 1, wherein the amount of fluoro compound is greater than the molar amount of asbestos.

6. The method according to claim 1, wherein the fluorine scavenger compound is boric acid.

7. The method according to claim 1, wherein the fluoro compound is hexafluoro titanium di-ammonium.

* * * * *